(12) United States Patent
Eastburn

(10) Patent No.: US 7,447,251 B2
(45) Date of Patent: *Nov. 4, 2008

(54) FREQUENCY HOPPING SPREAD SPECTRUM SCHEME FOR RFID READER

(75) Inventor: David Lee Eastburn, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/622,891

(22) Filed: Jan. 12, 2007

(65) Prior Publication Data

US 2007/0230540 A1    Oct. 4, 2007

Related U.S. Application Data

(60) Division of application No. 11/465,788, filed on Aug. 18, 2006, which is a continuation-in-part of application No. 10/814,411, filed on Mar. 30, 2004, now Pat. No. 7,103,087.

(60) Provisional application No. 60/459,414, filed on Mar. 31, 2003.

(51) Int. Cl.
*H04B 1/00* (2006.01)
*H03K 7/06* (2006.01)
*H04L 5/14* (2006.01)
*H04L 5/26* (2006.01)

(52) U.S. Cl. ........................ 375/132; 375/133; 375/239; 370/295; 370/302; 370/319

(58) Field of Classification Search .................. 375/239, 375/271, 259, 130, 132, 133; 370/295, 302, 370/319, 322, 325, 344, 343, 480; 455/42, 455/63.3

See application file for complete search history.

(56) References Cited

U.S. PATENT DOCUMENTS 5,446,447 A    8/1995   Carney et al.
5,471,469 A * 11/1995   Flammer et al. ............ 370/346

(Continued)

FOREIGN PATENT DOCUMENTS

EP    0 598 624 B1    5/1994
EP    0 689 161 A2    12/1995
EP    0 899 677 A2    3/1999

OTHER PUBLICATIONS

Final Official Action Dated Jan. 25, 2008 in U.S. Appl. No. 10/779,320 filed Feb. 12, 2004.

(Continued)

*Primary Examiner*—Shuwang Liu
*Assistant Examiner*—Linda Wong
(74) *Attorney, Agent, or Firm*—Paul A. Maltseff; John H. Sherman

(57) ABSTRACT

A system and method is provided for implementing forced frequency "hops" if the time it takes to perform a particular transaction is greater than the time available on a particular carrier frequency. In one embodiment of the present invention, a radio frequency identification (RFID) base station processor (in conjunction with program information stored in a base station memory) is adapted to (i) determine the amount of time available on a particular carrier frequency (e.g., pursuant to Federal Communications Commission (FCC) regulations, European Telecommunications Standardization Institute (ETSI) regulations, etc.), (ii) determine the amount of time it would take to perform a particular transaction, and (iii) force the base station to "hop" to another carrier frequency if the transaction time is longer than the available time. In one embodiment of the present invention, the time it would take to perform a particular transaction is the time it would take to perform the next transaction. In another embodiment of the present invention, the time it would take to perform a particular transaction is the time it would take to perform the longest (or "worst-case") transaction. In alternate embodiments of the present invention, a transaction is defined as the transmission of information (e.g., data, commands, etc.) or both the transmission of information and the reception of related information.

25 Claims, 3 Drawing Sheets

U.S. PATENT DOCUMENTS

| | | | |
|---|---|---|---|
| 5,533,025 A | 7/1996 | Fleek et al. | |
| 5,583,819 A | 12/1996 | Roesner et al. | |
| 5,613,228 A | 3/1997 | Tuttle et al. | |
| 5,832,384 A * | 11/1998 | Balachandran et al. | 455/450 |
| 6,278,413 B1 | 8/2001 | Hugh et al. | |
| 6,286,762 B1 | 9/2001 | Reynolds et al. | |
| 6,286,763 B1 | 9/2001 | Reynolds et al. | |
| 6,318,636 B1 | 11/2001 | Reynolds et al. | |
| 6,429,775 B1 | 8/2002 | Martinez et al. | |
| 6,434,183 B1 | 8/2002 | Kockmann et al. | |
| 6,486,769 B1 * | 11/2002 | McLean | 340/10.32 |
| 6,600,418 B2 | 7/2003 | Francis et al. | |
| 6,784,789 B2 | 8/2004 | Eroglu et al. | |
| 6,862,438 B2 | 3/2005 | Darabi | |
| 6,967,934 B1 | 11/2005 | Kockmann et al. | |
| 2002/0046173 A1 | 4/2002 | Kelly | |
| 2002/0122405 A1 | 9/2002 | Liang | |
| 2002/0186749 A1 | 12/2002 | Jones | |
| 2003/0183697 A1 | 10/2003 | Porter | |
| 2003/0189638 A1 * | 10/2003 | Fry | 348/154 |
| 2004/0036595 A1 | 2/2004 | Kenny et al | |
| 2005/0141562 A1 | 6/2005 | Chen et al. | |
| 2005/0274801 A1 | 12/2005 | Harding et al. | |

OTHER PUBLICATIONS

Paulsen, T, et al. "Autarkic Object Positioning and Locating System with MEMS-based Devices" U.S. Appl. No. 60/527,110 filed Dec. 3, 2003.

* cited by examiner

FREQUENCY HOPPING SPREAD SPECTRUM SCHEME FOR RFID READER

CROSS-REFERENCES TO RELATED APPLICATIONS

The present application is a division of Nonprovisional application Ser. No. 11/465,788 filed Aug. 18, 2006, which is a continuation in part of Nonprovisional application Ser. No. 10/814,411 filed Mar. 30, 2004, and published as US 2004/0189443 A1 on Sep. 30, 2004, now U.S. Pat. No. 7,103,087 issued Sep. 5, 2006, which claims benefit pursuant to 35 U.S.C. 119(e) of U.S. Provisional Application No. 60/459,414 filed Mar. 31, 2003, said Nonprovisional application Ser. No. 10/814,411 and said Nonprovisional Application No. 60/459,414 being specifically incorporated herein, in their entirety, by reference.

BACKGROUND OF THE INVENTION

1. Field of the Invention

The present invention relates to a frequency hopping spread spectrum (FHSS) scheme for radio frequency identification (RFID) devices, and more particularly to a system and method for improving transmission rates in an RFID device by implementing forced frequency "hops."

2. Description of Related Art

Radio Frequency Identification (RFID) base stations, which operate in conjunction with RFID transponders (tags), are used in a variety of applications (e.g., inventory-control, security, etc.). Typically, an item including an RFID tag (e.g., a container with an RFID tag inside) is brought into a "read zone" established by the base station. The base station transmits an interrogating RF signal that is modulated, in part, by the receiving tag. That is, in reading the tag, the base station generates and transmits a continuous wave electromagnetic disturbance at a particular carrier frequency. This disturbance is then modulated by the receiving tag in order to impart information (e.g., information stored within the tag) into the signal. The modulated RF signal is then reflected back to the base station where the imparted information is extracted.

When interrogating an RFID tag, however, the amount of time that can be spent on a particular carrier frequency is regulated by the Federal Communications Commission (FCC). The FCC, at least with respect to the Instrumentation, Scientific and Medical (ISM) bands, only allows transmitters operating under the Frequency Hopping Spread Spectrum (FHSS) methodology to continuously transmit over a particular carrier frequency for up to four hundred milliseconds. After that, the transmitter is required to transmit over a different carrier frequency (i.e., "hop" to a new carrier frequency). For example, a transmitter could transmit an RF signal for four hundred milliseconds over a first frequency, "hop" to a second frequency, transmit an RF signal for four hundred milliseconds over the second frequency, "hop" to a third frequency, etc.

One of the drawbacks associated with traditional FHSS systems is that time is wasted when the transmitter is not transmitting (i.e., when the transmitter is "dwelling"). Dwelling results from two common FHSS characteristics—(i) frequency synchronization and (ii) transmission/allocation time variance. First, FHSS systems are traditionally designed to operate using synchronized frequencies. In other words, in most FHSS systems, the frequency at which the transmitter is transmitting needs to be same as (or synchronized with) the frequency at which the receiver is receiving, This is typically achieved by using a common algorithm (i.e., an algorithm known to both the transmitter and the receiver). For example, a common algorithm may dictate that the available bandwidth (i.e., the frequency spectrum) is to be divided into seventy-five channels (i.e., seventy-five frequencies), and that the first communication cycle is to be transmitted over the first channel for four hundred milliseconds, the second communication cycle is to be transmitted over the second channel for four hundred milliseconds, etc.

By following the common algorithm, the transmitter and the receiver are able to "hop" from channel to channel in unison. If the transmitter were to "hop" early (e.g., "hop" to the second channel before the elapse of four hundred milliseconds), the system would become unsynchronized. In other words, the transmitter would be transmitting data over the second channel while the receiver (in accordance with the algorithm) would be attempting to receive data over the first channel. Therefore, it is imperative that the transmitter follow the common algorithm and remain at each channel for the prescribed amount of time.

This raises the next issue—i.e., transmission/allocation time variance, or whether there is a variance between the time it takes to transmit data and the time allotted (or prescribed) by the common algorithm. For example, if the allotted time is four hundred milliseconds and it takes one hundred and fifty milliseconds to transmit one item of data, then two items of data (i.e., three hundred milliseconds worth) is all that can be transmitted over a single channel. This is because it would take four hundred and fifty milliseconds to transmit three items of data, which would violate the time allotted (i.e., pursuant to FCC regulations). This results in a dwelling period of one hundred milliseconds per channel (i.e., the allotted time minus the transmitting time equals the dwelling period).

While dwelling periods are often associated with systems having the above-mentioned characteristics, they are not limited to such systems. For example, an FHSS system that does not require frequency synchronization may still experience dwelling periods. This is because non-synchronized FHSS systems typically operate under the assumption that maximum transmission rates are achieved by minimizing the "hop" rate. In other words, a maximum transmission rate will be achieved by spending more time transmitting data and less time "hopping" from channel to channel.

Traditional RFID systems operating under the FHSS methodology do not require frequency synchronization. This is because RFID tags can be designed to receive, without "hopping," signals transmitted over various carrier frequencies. This leaves the RFID base station free to "hop" unilaterally (i.e., without using a common algorithm). Nonetheless, because such systems typically operate under the assumption that maximum transmission rates are synonymous with minimum "hop" rates, algorithms are employed to "hop" only after the expiration of the time allotted by the FCC (i.e., four hundred milliseconds). The drawback with such a system (i.e., fixing the "hop" period) is that a dwelling period is created if the transmission time is not equal to the time allotted by the FCC, as previously explained.

Thus, it would be advantageous to provide an FHSS scheme that forced RFID base stations to "hop" instead of "dwell" when timing constraints prohibit the transmission of additional data.

SUMMARY OF THE INVENTION

The present invention provides a system and method for improving transmission rates in RFID base stations by implementing forced frequency "hops." In a preferred embodiment of the present invention, the RFID base station is adapted to calculate whether the next transaction can be performed over the current carrier frequency or whether a "hop" to a new carrier frequency should be forced. More particularly, in one embodiment of the present invention, a base station processor (in conjunction with program information stored in a base station memory) is adapted to (i) determine the amount of time available on a particular carrier frequency (e.g., pursuant to FCC regulations, European Telecommunications Standardization Institute (ETSI) regulations, etc.), (ii) determine the amount of time it would take to perform a particular transaction, and (iii) force the base station to "hop" to another carrier frequency if the transaction time is longer than the available time. Such a system improves transmission rates by forcing a "hop," as opposed to dwelling, when the transaction time is longer than the available time. In one embodiment of the present invention, the time it would take to perform a particular transaction is the time it would take to perform the next transaction. In another embodiment of the present invention, the time it would take to perform a particular transaction is the time it would take to perform the longest (or "worst-case") transaction.

A more complete understanding of the system and method for improving transmission rates in RFID base stations by implementing forced frequency "hops" will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENTS

The present invention provides a system and method for improving transmission rates in RFID base stations by implementing forced frequency "hops." In the detailed description that follows, like element numerals are used to describe like elements illustrated in one or more figures.

Figure 1:
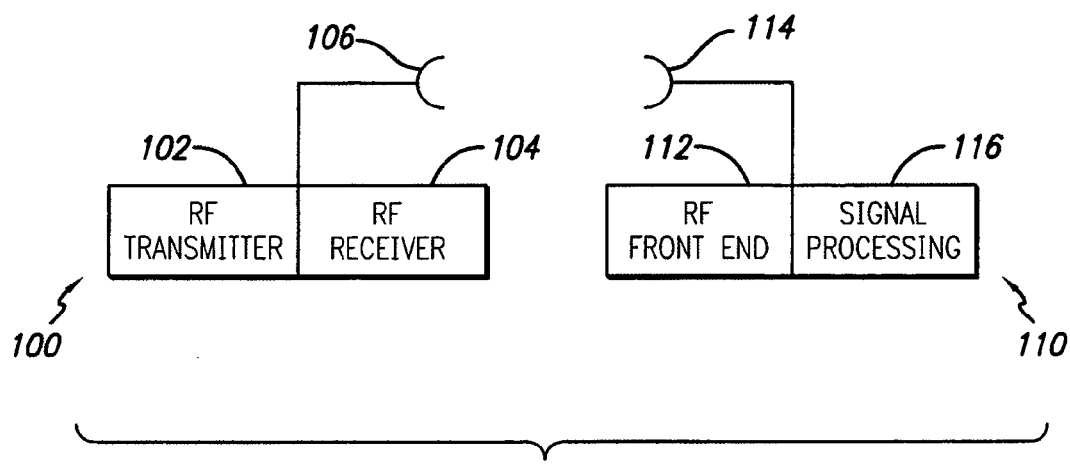
FIG. 1 is a conceptual block diagram of a RFID system including a base station and an RFID tag.

An RFID system in accordance with the principles of the present invention is illustrated in the conceptual block diagram of FIG. 1. A base station 100 includes (in part) an RF transmitter 102, an RF receiver 104, and an antenna 106 connected to the transmitter 102 and receiver 104. An RFID tag 110 such as may be used in conjunction with the base station 100 includes an RF front end 112, a signal processing section 116, and an antenna 114. The RFID tag 110 may further include a memory (not shown) in which data may be stored, retrieved and/or written.

In reading the RFID tag 110, the base station 100 interrogates the tag 110 by generating an RF signal over a carrier frequency. The carrier frequency, and more particularly the amount of time spent transmitting over a particular carrier frequency, will be discussed in more detail below. The RF signal is coupled to the antenna 106 and transmitted to the tag 110. The RF signal emitted by the antenna 106 will, ostensibly, be received by the tag antenna 114 if the tag 110 is within the transmitting range of the base station 100. If the field strength of the RF signal satisfies a predetermined read threshold requirement, the RFID tag 110 will respond to the reception of the signal by modulating the RF carrier to impart information about the tag onto the back-scattered RF field. The RF field is then propagated to the base station 100, where the imparted information can be extracted.

Figure 2:
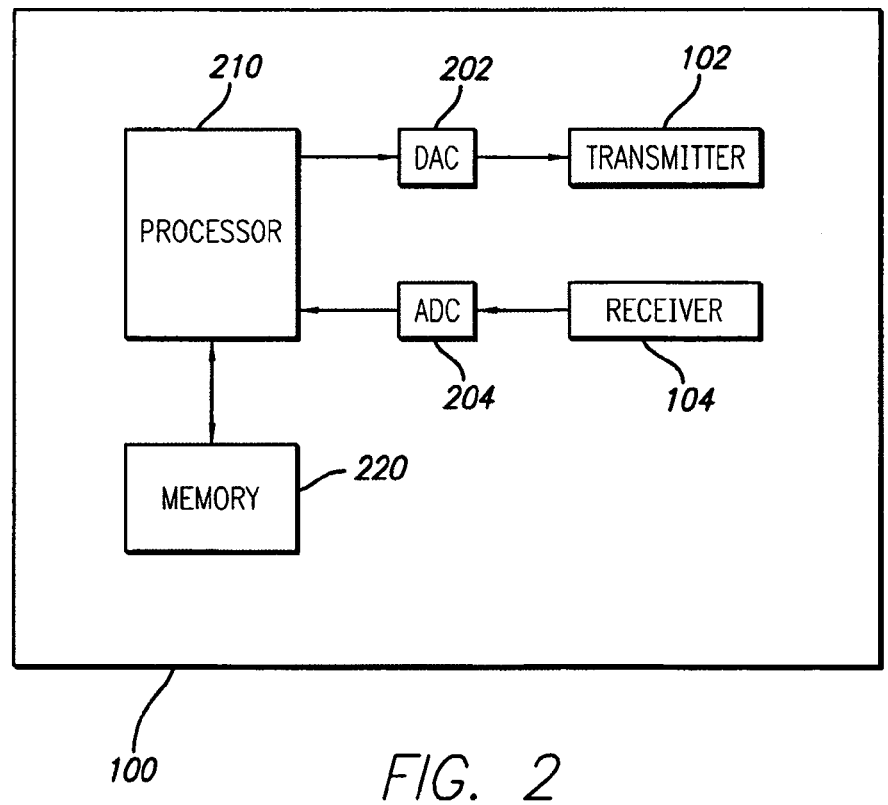
FIG. 2 further illustrates the RFID base station depicted in FIG. 1.

A more detailed diagram of the RFID base station 100 is shown in FIG. 2. Specifically, in a preferred embodiment, the base station 100 includes a memory device 220 and a processor 210 connected to an RF transmitter 102 and an RF receiver 104 via a digital-to-analog (D/A) converter 202 and an analog-to-digital (A/D) converter 204, respectively. When interrogating the RFID tag, digital signal data (in accordance with information stored in the memory device 220 and information provided by a host application (not shown)) is provided by the processor 210, converted into analog signal data by the D/A converter 202, and transmitted to the RFID tag via the transmitter 102 (or more particularly via the antenna connected to the transmitter (see FIG. 1)). Back-scattered data is then received by the receiver 104 (or more particularly the antenna connected to the receiver (see FIG. 1)), converted into digital data by the A/D converter 204, and provided to the processor 210 (e.g., to be further processed, stored in memory 220, provided to the host application (not shown), etc.).

It should be appreciated that the memory device 220 depicted in FIG. 2 includes, but is not limited to, RAM, cache memory, flash memory, EPROMs, EEPROMs, hard drives, removable drives and all other types of data storage devices generally known to those skilled in the art. It should further be appreciated that the processor 210 depicted in FIG. 2 includes, but is not limited to, application specific integrated circuits (ASICs), processors, microprocessors, programmable devices and all other computing devices generally known to those skilled in the art.

It should also be appreciated that the location, type, and/or number of components illustrated in FIG. 2 are merely to exemplify the environment in which the present invention operates, and should not be considered limitations of the present invention. For example, a RFID base station including more than one memory device, having components in different locations (e.g., a D/A converter within the transmitter, a memory device external to the base station, etc.), or having additional (or fewer) components is within the spirit and scope of the present invention.

In a preferred embodiment of the present invention, the RFID base station is adapted to calculate whether enough time is available to perform the next transaction over the current carrier frequency or whether the base station should "hop" to a new carrier frequency before performing the transaction. This is because the Federal Communications Commission (FCC), for example, regulates the amount of time that can be spent on certain carrier frequencies. As described above, in Frequency Hopping Spread Spectrum (FHSS) devices, the FCC limits the time that can be spent (continuously) on a particular carrier frequency to four hundred milliseconds.

Referring again to FIG. 2, the processor 210 (in conjunction with information stored in memory 220 and/or information provided by the host application (not shown)) is adapted to determine whether enough time is available to perform the next transaction over the current carrier frequency or whether the base station should "hop" to a new carrier frequency before commencing the transaction. More particularly, in one embodiment of the present invention, the processor 210 (in conjunction with the stored and/or provided information) is adapted to (i) determine the amount of time available on a particular carrier frequency (e.g., pursuant to FCC regulations, ETSI regulations, etc.), (ii) determine the amount of time it would take to perform a particular transaction (e.g., transmit the next item of data, transmit the largest item of data (i.e., worst-case scenario), etc.), and (iii) force a "hop" to another carrier frequency if the transaction time is longer than the available time.

Figure 3:
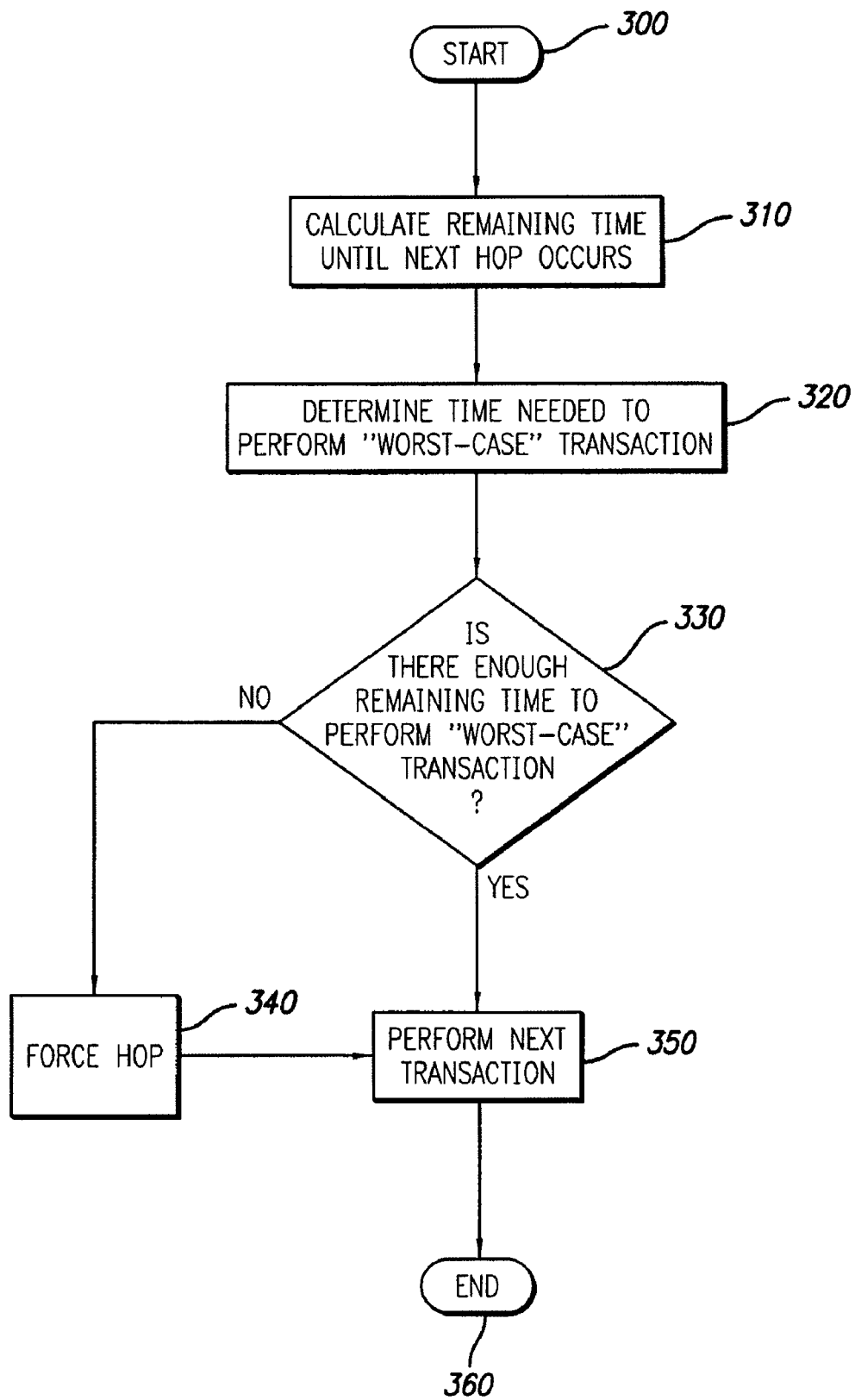
FIG. 3 is a flow chart illustrating one embodiment of the present invention.

One method of increasing the transmission rate of an RFID base station is illustrated in FIG. 3. Specifically, starting at step 300, the amount of time available on a particular carrier frequency is calculated at step 310. In traditional RFID systems, this amount of time coincides with the next "hop" (i.e., "hop" after the allotted time expires).

At step 320, the amount of time it would take to perform the longest possible transaction (i.e., the "worst-case" transaction) is determined. For example, if two possible transactions existed (i.e., data read and data write), a data read transaction takes fifty milliseconds, and a data write transaction takes one hundred milliseconds, the longer of the two transactions (i.e., data write) would be used. The information collected during steps 310 and 320 is then used to calculate whether the next transaction can be performed over the current carrier frequency at step 330 (i.e., whether the transaction time is less than the available time). If the answer is "Yes," then the next transaction is performed at step 350, ending the process at step 360. Alternatively, if the answer is "No," then a "hop" is forced at step 340 (i.e., the base station "hops" to a new carrier frequency) and the next transaction is performed over the new carrier frequency at step 350, ending the process at step 360.

Figure 4:
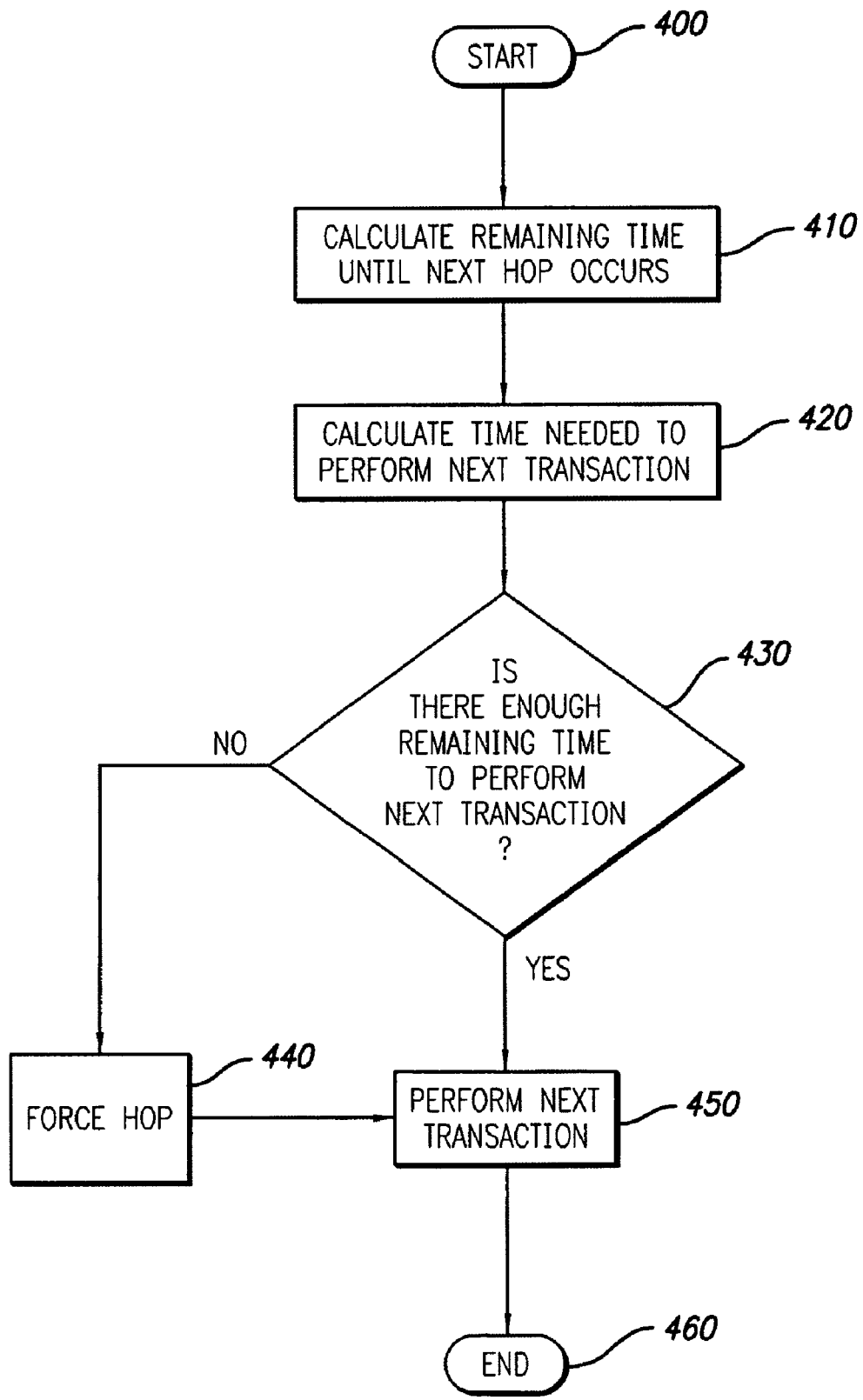
FIG. 4 is a flow chart illustrating another embodiment of the present invention.

Another method of increasing the transmission rate of an RFID base station is illustrated in FIG. 4. Specifically, starting at step 400, the amount of time available on a particular carrier frequency is calculated at step 410. At step 420, the amount of time it would take to perform the next transaction (e.g., transmit the next item of information, etc.) is calculated. This information is then used at step 430 to calculate whether the next transaction can be performed over the current carrier frequency (i.e., whether the transaction time is less than the available time). If the answer is "Yes," then the next transaction is performed at step 450, ending the process at step 460. Alternatively, if the answer is "No," then a "hop" is forced at step 440 (i.e., the base station "hops" to a new carrier frequency) and the next transaction is performed over the new frequency at step 450, ending the process at step 460.

Having thus described embodiments of a system and method for improving transmission rates in RFID base stations, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

The invention claimed is:

1. A radio frequency identification (RFID) system, comprising:

An RFID base station adapted to communicate via radio frequency signals having a sequence of carrier frequencies comprising a first carrier frequency and a second carrier frequency each having an allotted amount of transmission time with said RFID base station comprising:

a transmitter adapted to transmit said radio frequency (RF) signals; and a processor electrically connected to said transmitter;

said processor prior to the sending of a particular radio frequency signal, being adapted to determine the amount of remaining time available on said first carrier frequency before expiration of the allotted amount of transmission time;

said processor prior to the sending of said particular radio frequency signal, being adapted to determine the amount of time it would take to perform a particular transaction;

and said processor prior to the sending of said particular RF signal, being adapted to prematurely force a change to said second carrier frequency for the sending of said particular radio frequency signal before said amount of remaining time available on said first carrier frequency expires when said amount of remaining time on said first carrier frequency is less than said amount of time it would take to perform said particular transaction.

2. The RFID system of claim 1, wherein, said processor is adapted to prematurely force a change to said second carrier frequency over a range of time intervals of substantial duration before said amount of remaining time available on said first carrier frequency expires when said amount of remaining time on said first carrier frequency is less than said amount of time it would take to perform said particular transaction.

3. The RFID system of claim 1, wherein said particular transaction further comprises a worst-case transaction, such that said processor is adapted to determine the amount of time it would take to perform the longest possible transaction.

4. The RFID system of claim 1, wherein said particular transaction further comprises a worst-case transaction, such that said processor is adapted to determine the amount of time it would take to perform the longest possible transaction with at least one RFID transponder.

5. The RFID system of claim 1, wherein said particular transaction is the transmission of said particular radio frequency signal, such that said processor is adapted to determine the amount of time it would take to transmit said particular radio frequency signal.

6. The RFID system of claim 1, wherein said particular transaction is both the transmission of said particular radio frequency signal and an expected reception of a particular radio frequency signal in response thereto, such that said processor is adapted to determine the amount of time it would take to transmit said particular radio frequency signal and the expected amount of time it would take to receive said particular radio frequency signal in response thereto.

7. The RFID system of claim 1, further comprising at least one RFID transponder adapted to transmit radio frequency signals to said RFID base station.

8. The RFID system of claim 1, wherein said RFID base station further comprises a memory device electrically connected to said processor, wherein said memory device is adapted to store at least partial program information as to when said RFID base station should hop to a different carrier frequency of said sequence of carrier frequencies.

9. The RFID system of claim 1, further comprising a digital-to-analog (D/A) converter, said D/A converter electrically connecting said processor to said transmitter.

10. The RFID system of claim 1, wherein said particular transaction requires about one hundred milliseconds of transmission time, said processor being adapted to prematurely force a change to said second carrier frequency for the sending of said particular radio frequency signal, over a range of time intervals of substantial duration including a time interval somewhat less than one hundred milliseconds before said amount of remaining time available on said first carrier frequency expires, when said amount of remaining time on said first carrier frequency is less than said amount of time it would take to perform said particular transaction.

11. The RFID system of claim 1, wherein said particular transaction comprises transmission of said particular radio frequency signal which requires about fifty milliseconds of transmission time, said processor being adapted to prematurely force a change to said second carrier frequency for the sending of said particular RF signal, over a range of time intervals of substantial duration including a time interval somewhat less than fifty milliseconds before said amount of remaining time available on said first carrier frequency expires, when said amount of remaining time on said first carrier frequency is less than about fifty milliseconds.

12. A method for improving transmission rates in a radio-frequency-identification (RFID) base station, comprising:
performing a first transaction with at least one RFID transponder over a first carrier frequency; prior to sending a particular radio frequency signal, determining the amount of remaining time available on said first carrier frequency; prior to sending said particular radio frequency signal, determining the amount of time it would take to perform a particular transaction; prematurely forcing said RFID base station to hop to a second carrier frequency to send said particular radio frequency signal before said amount of time available on said first carrier frequency expires when said amount of remaining time on said first carrier frequency is less than said amount of time it would take to perform said particular transaction.

13. The method of claim 12, wherein said step of determining the amount of time it would take to perform a particular transaction further comprises determining the amount of time it would take to perform a transaction which requires an amount of time at least as great as the time required to send said particular radio frequency signal.

14. The method of claim 12, wherein said step of determining the amount of time it would take to perform a particular transaction further comprises determining the amount of time it would take to perform a worst-case transaction, said worst-case transaction being the longest transaction that can be performed by said RFID base station.

15. The method of claim 12, wherein said step of determining the amount of time it would take to perform a particular transaction further comprises determining the amount of time it would take to perform a worst-case transaction, said worst-case transaction being the longest transaction that can be performed by said RFID base station and with said at least one RFID transponder.

16. The method of claim 12, wherein said step of determining the amount of time it would take to perform a particular transaction further comprises determining the amount of time it would take to transmit said particular radio frequency signal.

17. The method of claim 12, wherein said step of determining the amount of time it would take to perform a particular transaction further comprises determining the amount of time it would take to transmit said particular radio frequency signal and an amount of time that it might take to receive a responsive radio frequency signal from said at least one RFID transponder.

18. The method of claim 12, wherein said step of performing a first transaction with at least one RFID transponder further comprises transmitting a first radio frequency signal to said at least one RFID transponder, said first radio frequency signal and said particular radio frequency signal each comprising information selected from a list of information consisting of commands and data.

19. The method of claim 12, said method further comprising prematurely forcing said RFID base station to hop to a second carrier frequency to send said particular radio frequency signal, over a range of time intervals of substantial duration before said amount of time available on said first carrier frequency expires when said amount of remaining time on said first carrier frequency is less than said amount of time it would take to perform said particular transaction.

20. The method of claim 12, wherein transmission of said particular radio frequency signal requires about fifty milliseconds of transmission time, said method further comprising forcing said RFID base station to hop to a second carrier frequency to send said particular radio frequency signal, over a range of time intervals of substantial duration including a time interval somewhat less than fifty milliseconds before said amount of time available on said first carrier frequency expires when said amount of remaining time on said first carrier frequency is less than about fifty milliseconds.

21. A method for improving transmission rates in a radio-frequency-identification communication station, comprising
(a) prior to performing a transaction by the transmission of a radio frequency signal where there is remaining time for transmission via a first carrier frequency, determining whether the transmission rate of the radio-frequency-identification communication station would be improved by prematurely forcing the radio-frequency-identification communication station to hop to a second carrier frequency to send said radio frequency signal,
(b) when the transmission rate of the radio-frequency-identification communication station would be improved, prematurely forcing the radio-frequency-identification communication station to hop to said second carrier frequency to send said radio frequency signal, and
(c) when the transmission rate of the radio-frequency-identification communication station would not be improved, performing the transaction by the transmission of said radio frequency signal at said first carrier frequency.

22. The method of claim 21, wherein said determining whether the transmission rate of the radio-frequency-identification communication station would be improved is carried out by determining whether the amount of time it would take to perform a worst-case transaction is available prior to expiration of the remaining time for transmission of the radio frequency signal via said first carrier frequency, said worst-case transaction being the longest transaction that can be performed by said radio-frequency-identification communication station.

23. The method of claim 21, wherein said determining whether the transmission rate of the radio-frequency-identification communication station would be improved is carried out by determining whether the amount of time it would take to transmit a particular radio frequency signal is available prior to expiration of the remaining time for transmission via said first carrier frequency.

24. The method of claim 21, wherein said method further comprises prematurely forcing the radio-frequency-identification communication station to hop to said second carrier frequency over a range of time intervals of substantial duration when the transmission rate of the radio-frequency-identification communication station would be improved by the premature hop.

25. The method of claim 21, wherein said determining whether the transmission rate of the radio-frequency-identification communication station would be improved is carried out by determining whether an amount of time of about fifty milliseconds is available prior to expiration of the remaining time for transmission via said first carrier frequency, and forcing the radio-frequency-identification communication station to hop to said second carrier frequency over a range of time intervals of substantial duration including a time interval somewhat less than fifty milliseconds when the transmission rate of the radio-frequency-identification communication station would be improved by the premature hop.

\* \* \* \* \*